(12) United States Patent
Kainaga et al.

(10) Patent No.: US 10,069,285 B2
(45) Date of Patent: Sep. 4, 2018

(54) GAS-INSULATED SWITCHGEAR

(71) Applicant: Mitsubishi Electric Corporation, Chiyoda-ku (JP)

(72) Inventors: Soichiro Kainaga, Chiyoda-ku (JP); Ryoko Kawano, Chiyoda-ku (JP); Manabu Yoshimura, Chiyoda-ku (JP); Takao Tsurimoto, Chiyoda-ku (JP); Shinichiro Nakauchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/325,196

(22) PCT Filed: Jul. 16, 2015

(86) PCT No.: PCT/JP2015/070355
§ 371 (c)(1),
(2) Date: Jan. 10, 2017

(87) PCT Pub. No.: WO2016/080018
PCT Pub. Date: May 26, 2016

(65) Prior Publication Data
US 2017/0194775 A1 Jul. 6, 2017

(30) Foreign Application Priority Data
Nov. 20, 2014 (JP) .................. 2014-235217

(51) Int. Cl.
*H02B 13/01* (2006.01)
*H02B 13/045* (2006.01)

(52) U.S. Cl.
CPC ........... *H02B 13/01* (2013.01); *H02B 13/045* (2013.01)

(58) Field of Classification Search
None
See application file for complete search history.

(56) References Cited

U.S. PATENT DOCUMENTS 5,070,597 A * 12/1991 Holt .................... F16L 5/02
138/103
2015/0262773 A1 9/2015 Yoshimura et al.
(Continued)

FOREIGN PATENT DOCUMENTS

JP 61-22733 A 1/1986
JP 3-251014 A 11/1991
(Continued)

OTHER PUBLICATIONS

International Search Report dated Sep. 29, 2015 in PCT/JP15/070355 Filed Jul. 16, 2015.
(Continued)

*Primary Examiner* — Courtney Smith
(74) *Attorney, Agent, or Firm* — Oblon, McClelland, Maier & Neustadt, L.L.P.

(57) ABSTRACT

A gas-insulated switchgear includes a grounded tank filled with insulation gas, a center conductor which is disposed in the grounded tank and to which a voltage is applied, an insulating support member which insulates and supports the center conductor, and a nonlinear resistive part disposed at least on a vertically lower side inner surface of the grounded tank and formed by an insulation material containing a nonlinear resistive material. If an electric field applied to the nonlinear resistive part is higher than an electric field value in a vicinity of a contact point between the nonlinear resistive part and a metallic foreign substance mixed in the grounded tank during an operation, a resistivity of the nonlinear resistive part at the center conductor side is lower than a resistivity at which a discharge delay time is equal to an electric field relaxation time constant.

17 Claims, 9 Drawing Sheets

(56) References Cited

U.S. PATENT DOCUMENTS

| | | | | |
|---|---|---|---|---|
| 2015/0325344 A1* | 11/2015 | Matsuzaki | ............ | C09D 133/14 |
| | | | | 252/62.3 Q |
| 2015/0357801 A1 | 12/2015 | Nakauchi et al. | | |
| 2016/0268784 A1* | 9/2016 | Yoshimura | ............. | H02G 5/065 |
| 2017/0069448 A1* | 3/2017 | Kainaga | ................. | H01H 33/56 |
| 2017/0149226 A1* | 5/2017 | Nakauchi | ............... | H02G 5/063 |

FOREIGN PATENT DOCUMENTS

| | | |
|---|---|---|
| JP | 4177628 B2 | 11/2008 |
| JP | 2009-284651 A | 12/2009 |
| JP | 2010-207047 A | 9/2010 |
| JP | 2014-13786 A | 1/2014 |
| WO | WO 2014/097729 A1 | 6/2014 |
| WO | 2014/112123 A1 | 7/2014 |

OTHER PUBLICATIONS

Office Action dated Jul. 11, 2017 in Japanese Patent Application No. 2016-560080 (with English translation).

* cited by examiner

DISCHARGE TIME DELAY [ns]
POSITIVE POLARITY

DISCHARGE TIME DELAY [ns]
NEGATIVE POLARITY

GAS-INSULATED SWITCHGEAR

TECHNICAL FIELD

The present invention relates to a gas-insulated switchgear in which a center conductor to which a high voltage is applied is accommodated in a grounded tank, and the center conductor and the grounded tank are insulated from each other by insulation gas filled in the grounded tank.

BACKGROUND ART

In a gas-insulated switchgear, a center conductor to which a high voltage is applied is accommodated in a metallic grounded tank, and insulation gas is confined to a space between the grounded tank and the center conductor, so that insulating performance is ensured. However, during manufacture or installation to a site, a foreign substance (dust, fiber, conductive or nonconductive solid substance, or the like) may be mixed into the grounded tank and deteriorates the insulation performance. The mixed foreign substance becomes charged by an electric field generated during current application, and receives an electrostatic force in an upward floating direction from the inner surface of the grounded tank. When the electrostatic force exceeds the gravity force acting on the foreign substance, the foreign substance floats up and moves toward the center conductor. When the foreign substance approaches or adheres to the center conductor, the electric field becomes locally high because the electric field is concentrated around the foreign substance. This may deteriorate the withstand voltage performance of the switchgear. In particular, when the foreign substance is metallic and linear, the insulation performance is considerably deteriorated because the electric field is intensely concentrated at an end of the foreign substance.

To address the problem about the metallic foreign substance, for example, in a conventional gas-insulated switchgear disclosed in Patent Document 1, a nonlinear resistive film having nonlinear resistance characteristics is provided on the tank inner surface thereof, thereby suppressing partial discharge around a metallic foreign substance and preventing the metallic foreign substance from becoming charged. Thus, floatation of the metallic foreign substance is suppressed.

CITATION LIST

Patent Document

Patent Document 1: Japanese Laid-Open Patent Publication No. 2010-207047 (FIG. 1)

SUMMARY OF THE INVENTION

Problems to be Solved by the Invention

However, in the conventional technology disclosed in Patent Document 1, when the position of a metallic foreign substance is shifted by vibration of the grounded tank due to an earthquake or installation of a circuit breaker, etc., partial discharge may occur in the vicinity of a contact point between the metallic foreign substance and the nonlinear resistive film so that the foreign substance may become charged. Accordingly, when an electrostatic force acting on the charges of the metallic foreign substance exceeds the gravity force acting on the metallic foreign substance, the metallic foreign substance starts to float up, and the insulation performance of the gas-insulated switchgear is considerably deteriorated.

The present invention has been made to solve the above problem, and an object of the present invention is to provide a gas-insulated switchgear capable of suppressing partial discharge around a metallic foreign substance even when a grounded tank vibrates, and further suppressing inflow of charges from a grounded tank to the metallic foreign substance.

Solution to the Problems

A gas-insulated switchgear according to the present invention includes: a grounded tank filled with insulation gas; a center conductor which is disposed in the grounded tank and to which a voltage is applied; an insulating support member which is attached to the grounded tank and which insulates and supports the center conductor; and a nonlinear resistive part which is disposed at least on a vertically lower side inner surface of the grounded tank, and which is formed by an insulation material containing a nonlinear resistive material, wherein if an electric field applied to the nonlinear resistive part is higher than an electric field value in a vicinity of a contact point between the nonlinear resistive part and a metallic foreign substance mixed in the grounded tank when an operation voltage is applied but no electric field relaxation has occurred, a resistivity of the nonlinear resistive part is lower than a resistivity at which a discharge delay time is equal to an electric field relaxation time constant.

Effect of the Invention

The configuration of the present invention provides an effect of enabling an electric field to be relaxed in the vicinity of the contact point between the metallic foreign substance and the grounded tank before occurrence of partial discharge in the vicinity of the contact point, and enabling charging of the metallic foreign substance to be suppressed, even when the position of the metallic foreign substance is shifted by vibration of the grounded tank.

DESCRIPTION OF EMBODIMENTS

Embodiment 1

Hereinafter, a gas-insulated switchgear according to Embodiment 1 of the present invention will be described in detail with reference to FIGS. 1 to 5.

Figure 1:
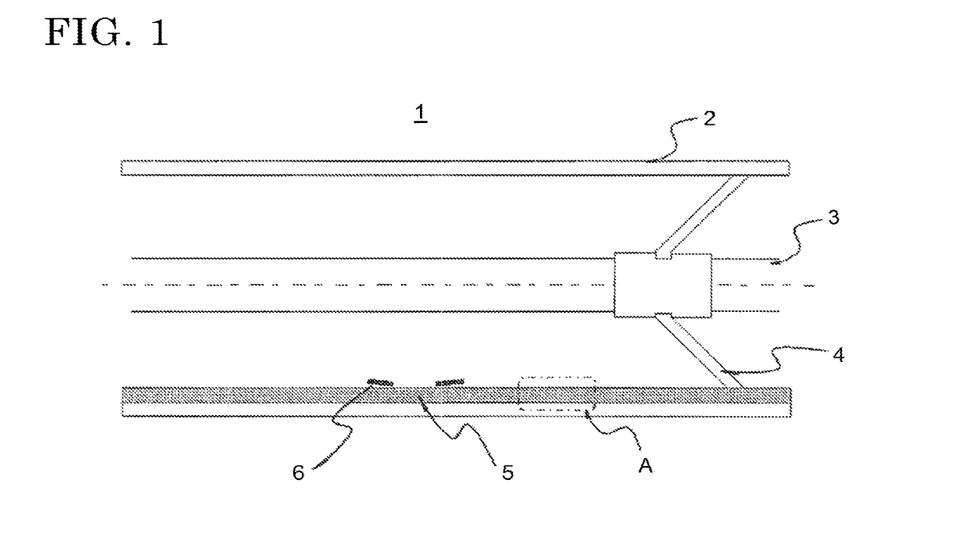
FIG. 1 is an axial cross-sectional view of a gas-insulated switchgear according to Embodiment 1 of the preset invention.
Figure 2:
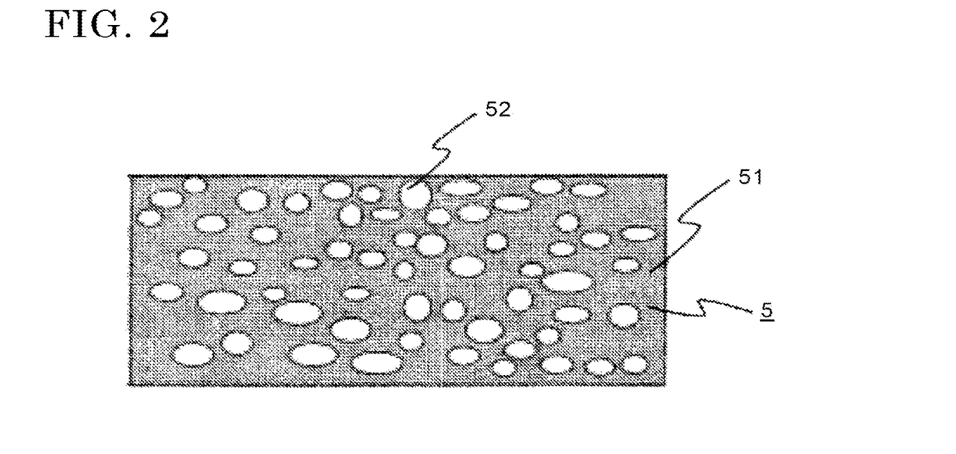
FIG. 2 is an enlarged view of a part A shown in FIG. 1.
Figure 3:
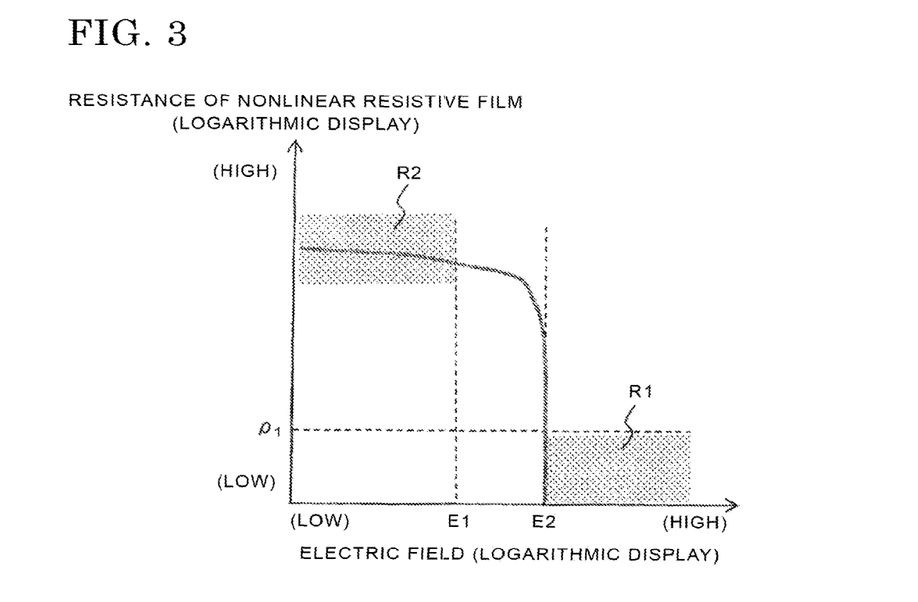
FIG. 3 is a diagram showing resistance characteristics, relative to an electric field, of a nonlinear resistive film according to Embodiment 1.
Figure 4:
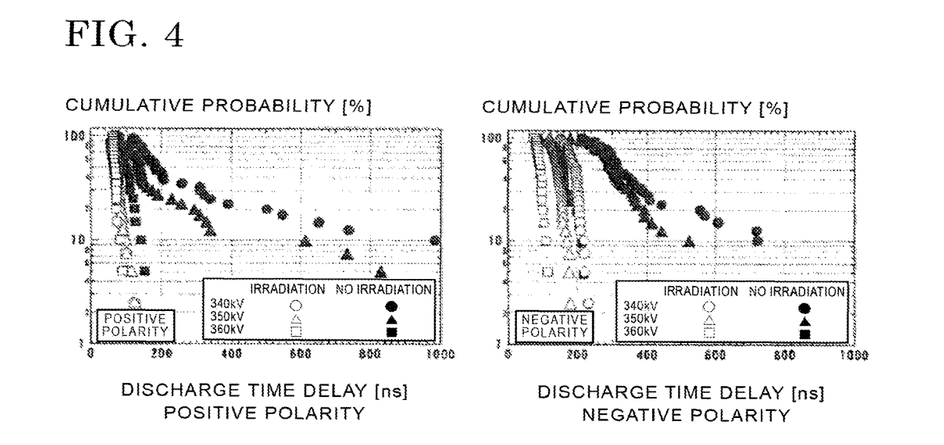
FIG. 4 is a diagram showing a relationship between a discharge time delay and a cumulative probability of occurrence of discharge.
Figure 5:
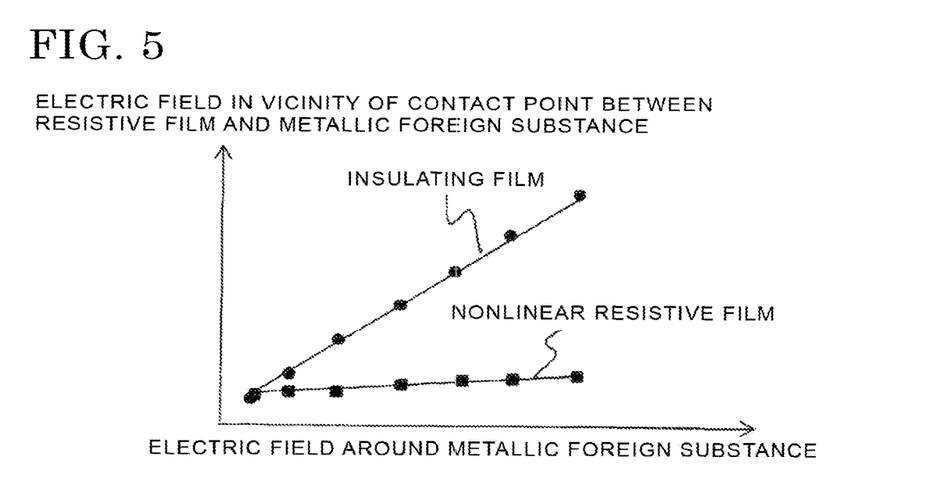
FIG. 5 is a diagram showing an electric field in the vicinity of a contact point between a metallic foreign substance and a film, in comparison of the nonlinear resistive of Embodiment 1 with a commonly-used film.

FIG. 1 is an axial cross-sectional view of the gas-insulated switchgear according to Embodiment 1. FIG. 2 is an enlarged view of a part A shown in FIG. 1. FIG. 3 is a diagram showing resistance characteristics, relative to an electric field, of a nonlinear resistive film according to Embodiment 1. FIG. 4 is a diagram showing a discharge time delay and a cumulative probability of discharge. FIG. 5 is a diagram showing an electric field in the vicinity of a contact point between a metallic foreign substance and a film at each of a commonly-used in film and the nonlinear resistive film of Embodiment 1.

In FIGS. 1 and 2, the gas-insulated switchgear 1 includes a metallic cylindrical grounded tank 2 which is a pressure container, a center conductor 3 which is disposed in the grounded tank 2 and to which a high voltage is applied, and an insulating support member 4 which is attached to the grounded tank 2 and which insulates and supports the center conductor 3. The center conductor 3 is fixed by the insulating support member 4 made of a solid insulating material, at the central position of the grounded tank 2 so as to be coaxial with the grounded tank 2. FIG. 1 shows a part of the gas-insulated switchgear 1. The gas-insulated switchgear 1 includes devices such as a circuit breaker, a disconnector, and an instrument transformer, in addition to the aforementioned components.

Insulation gas (not shown) for insulating the grounded tank 2 and the center conductor 3 from each other is filled therebetween. Examples of the insulation gas include single gases such as $SF_6$, dry air, $N_2$, $CO_2$, $O_2$, and $CF_3I$. Alternatively, a mixture of two or more of the above gases may be used.

A nonlinear resistive film 5 (nonlinear resistive part) is disposed on the inner surface of the grounded tank 2. For example, the nonlinear resistive film 5 is disposed at least on the vertically lower side inner surface of the grounded tank 2. In the nonlinear resistive film 5, a nonlinear resistive material 52 (for example, silicon carbide) is contained in an insulating material 51 the main component of which is a resin. The nonlinear resistive material 52 has a characteristic in which a resistance value thereof is high in a low electric field region but is low in a high electric field region.

Examples of the material 52 having nonlinear resistive characteristics include zinc oxide, gallium nitride, and diamond, in addition to silicon carbide. One of these nonlinear characteristic materials may be used, or a mixture of two or more of these materials may be used. In particular, when two or more of the materials are mixed, a resistance value in a low electric field region, a resistance value in a high electric field region, and an electric field value at which a low electric field region shifts to a high electric field region can be freely adjusted. In addition, a thermostatic resin or a thermosetting resin can be used as the insulating material 51. As the thermostatic resin, a vinyl chloride-based resin, a polyester-based resin, or a nylon-based resin, or the like is used. As the thermosetting resin, an epoxy-based resin, a urethane-based resin, an acryl-based resin, or the like is used. Further, examples of a method for forming the nonlinear resistive film 5 include brush coating, spray coating, and electrostatic coating (in which static electricity is applied to a powder to cause the powder to adhere to an object).

To achieve the nonlinear resistive film 5 which exhibits nonlinear resistive characteristics and causes no practical problem, the content ratio of the nonlinear resistive material 52 needs to fall within a specified value range. When silicon carbide, for example, is used as the nonlinear resistive material 52, the filling ratio of the nonlinear resistive material 52 needs to fall within the range of 30 to 80% by volume, for example. The lower limit value of the range is specified on the basis of an amount required for contact between silicon carbides, and the upper limit value is specified on the basis of a condition for preventing the nonlinear resistive film 5 from becoming brittle. That is, this specified value range may be determined on the basis of a condition for causing the nonlinear resistive film 5 to exhibit the nonlinear resistive characteristics and ensuring desired strength of the nonlinear resistive film 5.

FIG. 3 is a graph showing the resistance characteristics, relative to an electric field, of the nonlinear resistive film 5 according to Embodiment 1. As shown in FIG. 3, in a high electric field region, the resistivity of the nonlinear resistive film 5 at the center conductor 3 side is set to be lower than a resistivity $\rho_1$ at which an electric field relaxation time constant is equal to a discharge time delay. Here, the electric field relaxation time constant T is expressed by the following formula (1).

$$T = \varepsilon_r \varepsilon_o \rho \qquad (1)$$

Wherein $\varepsilon_r$ represents the relative permittivity of the nonlinear resistive film 5, $\varepsilon_o$ represents the vacuum permittivity, $8.85 \times 10^{-12}$ $m^{-3}kg^{-1}s^4A^2$, and $\rho$ is the resistivity of the nonlinear resistive film 5.

The discharge time delay is the sum of a statistical delay time required for initial electrons, which cause discharge, to be generated since voltage application, and a formation delay time required for the initial electrons to grow to discharge since the generation of the initial electrons. FIG. 4 shows the discharge delay time on the abscissa axis, and the cumulative probability of occurrence of discharge on the ordinate axis. FIG. 4 is a diagram quoted from a document (Central Research Institute of Electric Power Industry Research Report: T99036 "Study on Voltage-time Characteristics of SF6 in Very Short-time Range Using Steep-front Square Impulse Voltage under Quasi-uniform Field Gap"). It is understood that, in a case where initial electrons are supplied through RI irradiation and a discharge delay time in a spherical-flat electrode system is measured under a condition in which the statistical delay time can be ignored, the discharge delay time is longer than 50 ns at a probability of 99% or more even when application of a positive polarity, which shortens the discharge delay time, is performed. Thus, when 50 ns is assigned to the electric field relaxation time constant which is equal to the discharge time delay and 10 is assigned to the relative permittivity of the nonlinear resistive film 5 in formula (1), the resistivity of the nonlinear resistive film 5 is $1.1 \times 10^3$ Ωm. When the relative permittivity of the nonlinear resistive film 5 is not 10, the resistivity of the nonlinear resistive film 5 is adjusted with reference to formula (1) such that "vacuum permittivity×relative permittivity of nonlinear resistive film 5×resistivity of nonlinear resistive film 5" is less than 50 ns.

On the other hand, in a low electric field region, the resistivity of the nonlinear resistive film 5 is kept high enough for the nonlinear resistive film 5 to serve as an insulator. In FIG. 3, a region R1 represents a target resistivity region in a high electric field time, and a region R2 represents a target resistivity region in a low electric field time. In addition, E1 represents an electric field value around a metallic foreign substance 6 during a withstand voltage test, and E2 represents an electric field value in the vicinity of the contact point between the nonlinear resistive film 5 and the metallic foreign substance 6 mixed in the grounded tank 2 when an operation voltage is applied but no electric field relaxation has occurred.

Next, operation of the nonlinear resistive film 5 according to Embodiment 1 will be described. In FIG. 1, it is assumed that the fine metallic foreign substance 6 is mixed into the grounded tank 2 and present on the nonlinear resistive film 5.

When a voltage applied to the center conductor 3 is low, or when an electric field generated by the center conductor 3 is low, the nonlinear resistive material 52 in the nonlinear resistive film 5 serves as an insulator. Accordingly, inflow of charges from the grounded tank 2 to the metallic foreign substance 6 is blocked, and the metallic foreign substance 6 hardly becomes charged. Therefore, an electrical attraction caused by the electric field generated by the center conductor 3 does not exceed the weight of the metallic foreign substance 6 to cause the metallic foreign substance 6 to float up.

On the other hand, when a voltage applied to the center conductor 3 is high, or when an electric field generated by the center conductor 3 is high, the resistivity of the nonlinear resistive material 52 in the nonlinear resistive film 5 is low. Accordingly, a part of the nonlinear resistive film 5 near the center conductor 3 exhibits conductivity.

FIG. 5 is a diagram showing dependency of a local electric field in the vicinity the contact point between the metallic foreign substance 6 and the nonlinear resistive film 5 with respect to the electric field around the metallic foreign substance 6, in each of a commonly-used insulating film and the nonlinear resistive film 5 of Embodiment 1.

As shown in FIG. 5, electric field concentration is relaxed in the vicinity of the contact point between the nonlinear resistive film 5 and the metallic foreign substance 6, so that partial discharge is less likely to occur. Even if partial discharge occurs, charges flow and escape through a part of the nonlinear resistive film 5 facing the center conductor 3, and thus charging of the metallic foreign substance 6 is suppressed. On the other hand, a part of the nonlinear resistive film 5 near the grounded tank 2 maintains a high resistivity, so that charges are suppressed from moving from the inner surface of the grounded tank 2 to the metallic foreign substance 6 to charge the metallic foreign substance 6. For this reason, an electrical attraction caused by an electric field generated by the center conductor 3 does not exceed the weight of the metallic foreign substance 6 to cause the metallic foreign substance 6 to float up.

When a high electric field is applied, the resistivity ρ of the nonlinear resistive film 5 at the center conductor side is lower than the resistivity $ρ_1$ at which the electric field relaxation time constant is equal to the discharge time delay. Thus, even if the position of the metallic foreign substance 6 is shifted by vibration of the grounded tank 2, no partial discharge occurs because an electric field is relaxed before partial discharge occurs in the vicinity of the contact point between the metallic foreign substance 6 and the nonlinear resistive film 5.

As described above, the resistivity of the center conductor side surface of the nonlinear resistive film 5 is set to be lower than the resistivity at which the discharge delay time is equal to the electric field relaxation time constant in a case where an electrical field applied to the nonlinear resistive film 5 is higher than an electrical field value, during an operation, in the vicinity of the contact point between the nonlinear resistive film 5 and the metallic foreign substance 6 mixed in the grounded tank 2. With this configuration, even if the position of the metallic foreign substance 6 is shifted by vibration of the grounded tank 2, an electric field can be relaxed in the vicinity of the contact point between the metallic foreign substance 6 and the grounded tank 2 before partial discharge occurs in the vicinity of the contact point, so that occurrence of partial discharge can be suppressed. Further, setting the resistivity of the nonlinear resistive film 5 to be lower than $10^3$ Ωm (when the relative permittivity of the nonlinear resistive film 5 is 10) is more effective.

Embodiment 2

Next, a gas-insulated switchgear according to Embodiment 2 of the present invention will be described with reference to FIGS. 6 and 7.

Figure 6:
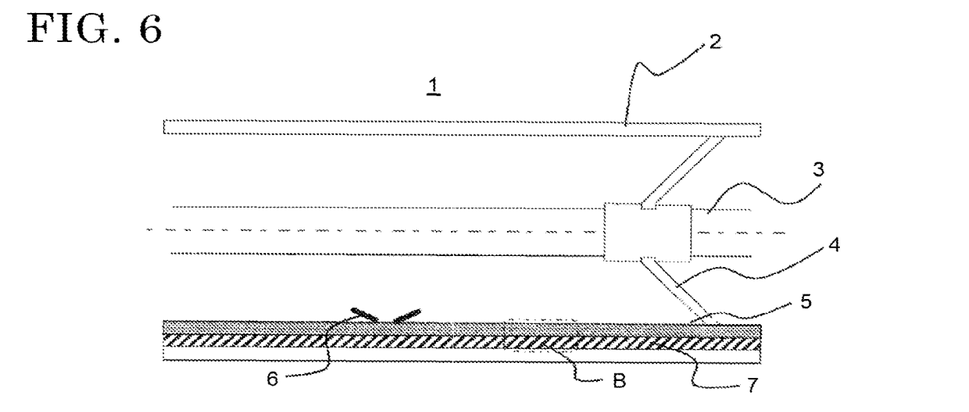
FIG. 6 is an axial cross-sectional view of a gas-insulated switchgear according to Embodiment 2 of the present invention.
Figure 7:
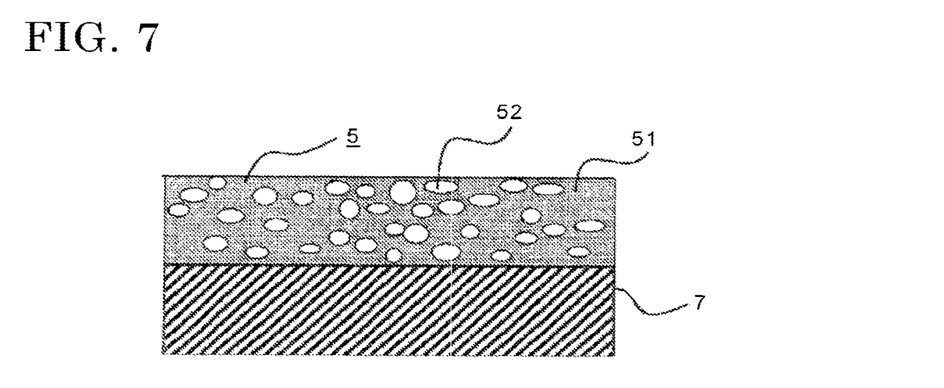
FIG. 7 is an enlarged view of a part B shown in FIG. 6.

FIG. 6 is an axial cross-sectional view of the gas-insulated switchgear according to Embodiment 2. FIG. 7 is an enlarged view of a part B shown in FIG. 6. In FIGS. 6 and 7, components identical or corresponding to those shown in FIGS. 1 and 2 are denoted by the same reference characters, and the detailed description thereof is omitted.

In Embodiment 1, only the nonlinear resistive film 5 is disposed on the inner surface of the grounded tank 2. In Embodiment 2, an insulating film 7 having high resistance is provided between the grounded tank 2 and the nonlinear resistive film 5. The other configuration is identical to that of Embodiment 1, and thus the description thereof is omitted.

As described above, when a voltage applied to the center conductor 3 is low, or when an electric field generated by the center conductor 3 is low, the nonlinear resistive film 5 serves as an insulator. However, when a high voltage is applied for a long time, charges flowing from the grounded tank 2 to the metallic foreign substance 6 gradually increase because the nonlinear resistive film 5 by itself has a lower resistance value than an insulating film. In Embodiment 2, because the insulating film 7 having high resistance is provided between the grounded tank 2 and the nonlinear resistive film 5, inflow of charges from the grounded tank 2 to the metallic foreign substance 6 is blocked, so that the metallic foreign substance 6 hardly becomes charged even with elapse of time.

In the gas-insulated switchgear 1 configured to include the insulating film 7 having high resistance between the grounded tank 2 and the nonlinear resistive film 5 as described above, even if a high voltage is applied for a long time, inflow of charges from the grounded tank 2 to the metallic foreign substance 6 can be suppressed and the metallic foreign substance 6 is prevented from becoming charged. Accordingly, behavior of the metallic foreign substance 6 can be suppressed.

Embodiment 3

Next, a gas-insulated switchgear according to Embodiment 3 of the present invention will be described with reference to FIGS. 8 to 11.

Figure 8:
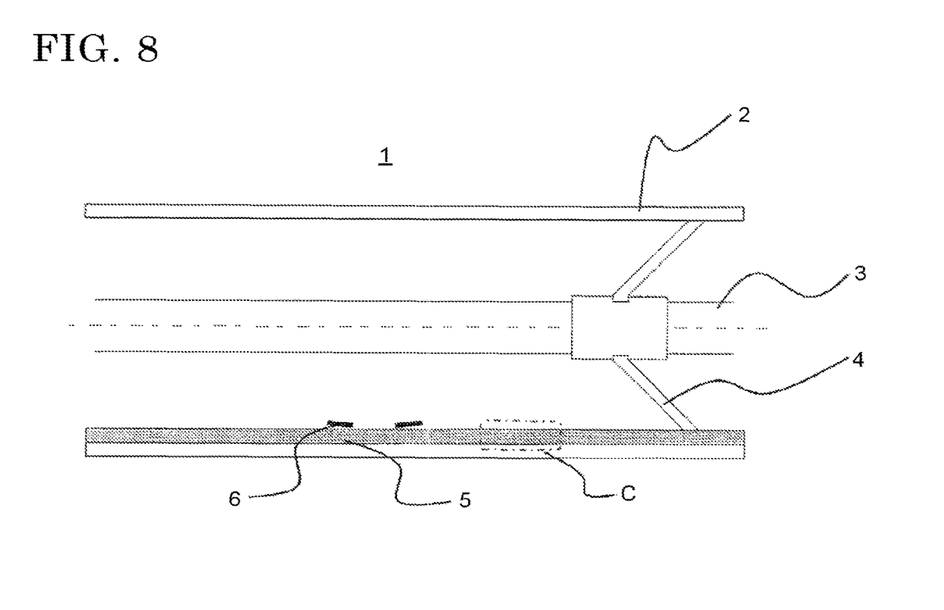
FIG. 8 is an axial cross-sectional view of a gas-insulated switchgear according to Embodiment 3 of the present invention.
Figure 9:
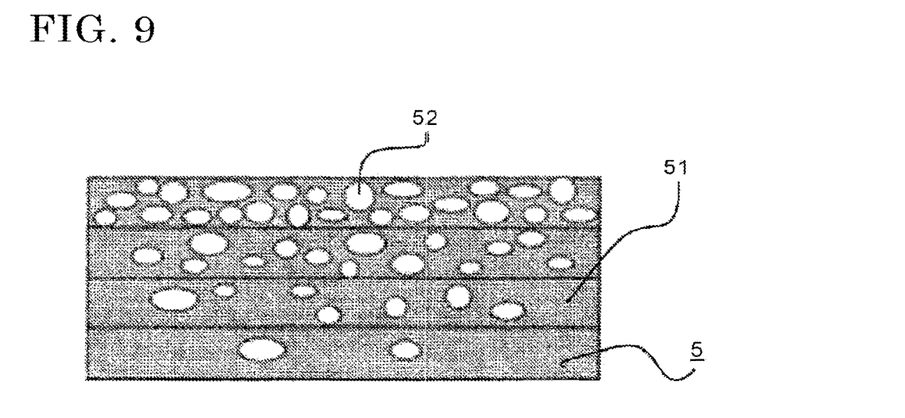
FIG. 9 is an enlarged view of a part C shown in FIG. 8.
Figure 10:
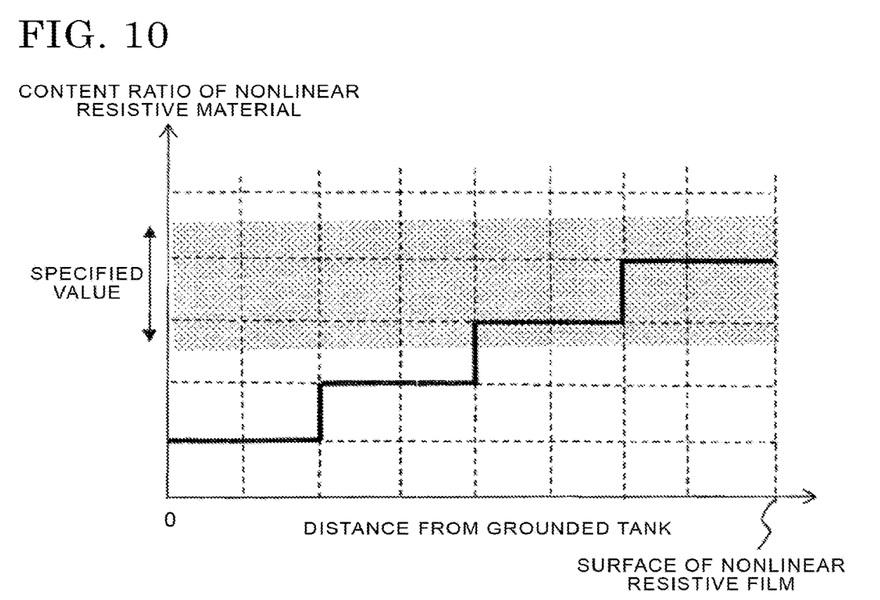
FIG. 10 is a diagram showing the content ratio distribution of a nonlinear resistive material in the thickness direction of a nonlinear resistive film according to Embodiment 3 of the present invention.
Figure 11:
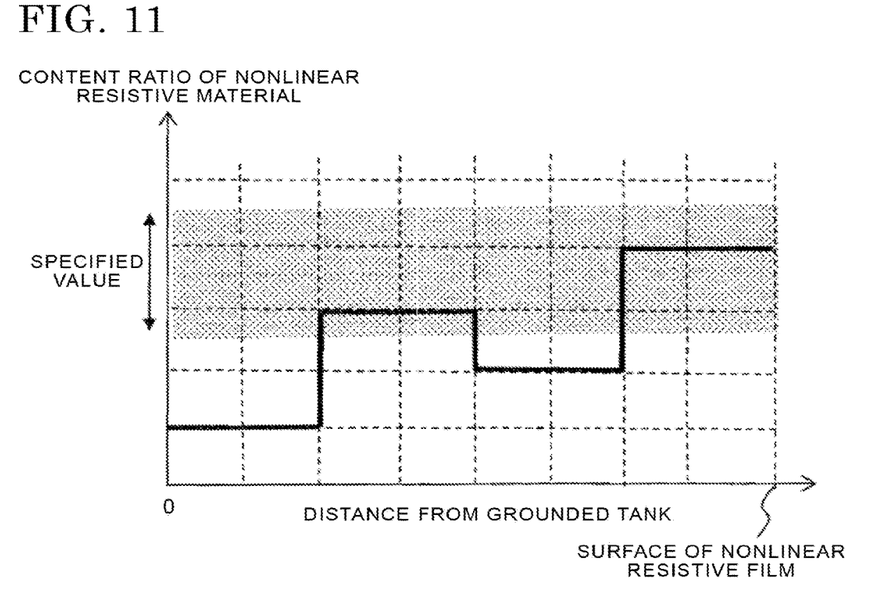
FIG. 11 is another diagram showing the content ratio distribution of the nonlinear resistive material in the thickness direction of the nonlinear resistive film according to Embodiment 3 of the present invention.

FIG. 8 is an axial cross-sectional view of the gas-insulated switchgear according to Embodiment 3. FIG. 9 is an enlarged view of a part C shown in FIG. 8. FIG. 10 is a diagram showing the content ratio distribution of a nonlinear resistive material in the thickness direction of a nonlinear resistive film according to Embodiment 3. FIG. 11 is a diagram, different from FIG. 10, showing the content ratio distribution of the nonlinear resistive material in the thickness direction of the nonlinear resistive film.

In FIGS. 8 and 9, components identical or corresponding to the components shown in FIG. 1 and FIG. 2 are denoted by same reference characters, and the detailed description thereof is omitted.

In Embodiment 2, the insulating film 7 is provided between the inner surface of the grounded tank 2 and the nonlinear resistive film 5. In Embodiment 3, the content ratio of the nonlinear resistive material 52 in the nonlinear resistive film 5 increases from the grounded tank 2 toward the center conductor 3.

As shown in FIG. 9, the content ratio of the nonlinear resistive material 52 in a portion of the nonlinear resistive film 5 facing the center conductor falls within the aforementioned specified value range. In contrast, the content ratio of the nonlinear resistive material 52 in a portion of the nonlinear resistive film 5 near the grounded tank 2 may be lower than the aforementioned specified lower limit value, and the portion may be almost occupied by the insulating material 51. When a high electric field is applied, the resistivity of the portion of the nonlinear resistive film 5 facing the center conductor 3 is set to be lower than the resistivity at which the electric field relaxation time constant is equal to the discharge time delay.

With the nonlinear resistive film 5 configured as described above, similarly as in Embodiment 2, even when a high voltage is applied for a long time, inflow of charges from the grounded tank 2 to the metallic foreign substance 6 can be suppressed, and the metallic foreign substance 6 is prevented from becoming charged. Accordingly, behavior of the metallic foreign substance 6 can be suppressed.

Next, a description will be given of a method for forming the nonlinear resistive film 5 such that the content ratio of the nonlinear resistive material 52 increases from the grounded tank 2 toward the center conductor 3.

In such a method, for example, coating may be performed a plurality of times while the ratio of the insulating material 51 and the nonlinear resistive material 52 is slightly changed. That is, the insulating material 51 is a coating material having insulating properties, and the nonlinear resistive film 5 is a coating film.

FIG. 10 is a diagram showing the content ratio distribution of the nonlinear resistive material 52 in the thickness direction of the nonlinear resistive film 5 according to Embodiment 3. The first layer formed on the inner surface of the grounded tank 2 is formed of almost only the insulating material 51. The second layer formed on the first layer contains the nonlinear resistive material 52 in an amount larger than that in the first layer. Similarly, the third layer contains the nonlinear resistive material 52 in an amount larger than that in the second layer. This is repeated for the fourth and higher layers, thereby forming the nonlinear resistive film 5. However, the content ratio of the nonlinear resistive material 52 in the layer closest to the highest-voltage center conductor 3 is set to fall within the aforementioned specified value range. In this way, the nonlinear resistive film 5 can be configured by including a plurality of layers which are formed by performing coating a plurality of times while the content ratio of the nonlinear resistive material 52 is changed.

With the nonlinear resistive film 5 configured as described above, a region near the grounded tank 2 can maintain a high resistance value because the ratio of the insulating material 51 having a high resistance value is high. Even if a high voltage is applied for a long time, inflow of charges from the grounded tank 2 to the metallic foreign substance 6 can be suppressed, and the metallic foreign substance 6 is prevented from becoming charged. Accordingly, behavior of the metallic foreign substance 6 can be suppressed. In addition, because the content ratio of the nonlinear resistive material 52 at the side near the center conductor 3 is within the specified value range, an electric field around the metallic foreign substance 6 can be relaxed by the nonlinear resistive material 52, and occurrence of partial discharge can be suppressed.

Further, in the gas-insulated switchgear 1 according to Embodiment 3, the following effects can also be obtained because the ratio of the nonlinear resistive material 52 contained in the nonlinear resistive film 5 gradually increases from the grounded tank 2 toward the center conductor 3.

That is, in a gas-insulated switchgear, temperature change of the surrounding environment and joule heat generated during current application generally cause a heat cycle in which increase and decrease in temperature are repeated. Accordingly, stress may act on the interface between materials having different thermal expansion coefficients in a direction away from the interface, so that interfacial separation may occur. When separation occurs, partial discharge may occur at the separated layer, and the insulation coating may be deteriorated by the discharge, so that the insulating function of the coating may be deteriorated. However, in Embodiment 3, the composition of the nonlinear resistive film 5 gradually changes from the layer in contact with the grounded tank 2 to the layer facing the center conductor 3. Therefore, the difference in thermal expansion coefficient among the respective layers is small, so that interfacial separation can be prevented.

Moreover, in the gas-insulated switchgear 1 according to Embodiment 3, the following effects can also be obtained because the ratio of the nonlinear resistive material 52 contained in the nonlinear resistive film 5 gradually increases from the grounded tank 2 toward the center conductor 3.

That is, when a current is applied to the center conductor 3, a current generally flows through the grounded tank 2, thereby increasing the temperature of the grounded tank 2. In addition, sunlight falling onto the grounded tank 2 also increases the temperature of the grounded tank 2. Here, if the nonlinear resistive film 5 is provided directly on the surface of the grounded tank 2 as in Embodiment 1, the resistivity of the nonlinear resistive material 52 in the nonlinear resistive film decreases due to the increase in temperature. However, in Embodiment 3, the layer in contact with the grounded tank 2 is substantially formed of the insulating material 51 which has a lower thermal conductivity than the nonlinear resistive material 52. Thus, even when the temperature of the grounded tank 2 increases, an increase in the temperature of the nonlinear resistive material 52 is suppressed, so that a reduction in the resistivity of the nonlinear resistive film 5 can be suppressed. As the typical nonlinear resistive material 52, silicon carbide, zinc oxide, gallium nitride, and diamond have thermal conductivities of 150 W/mK, 25 W/mK, 130 W/mK, and 1000 W/mK, respectively. An epoxy resin which is the typical insulating material 51 has a thermal conductivity of 0.3 W/mK.

In addition, in Embodiment 3, the content ratio distribution of the nonlinear resistive material 52 in the nonlinear resistive film 5 can be freely adjusted. Therefore, the content ratio distribution of the nonlinear resistive material 52 can be adjusted such that (1) no interfacial separation occurs, (2) inflow of a current from the grounded tank 2 side can be suppressed, and (3) partial discharge can be suppressed also in the vicinity of the metallic foreign substance 6. Once such a content ratio distribution is found, it is possible to reproduce the distribution with high accuracy.

In Embodiment 3, the nonlinear resistive film 5 is formed such that the content ratio of the nonlinear resistive material 52 gradually increases from the grounded tank 2 toward the center conductor 3. However, in some portions, the content ratio of the nonlinear resistive material 52 in an outer layer (center conductor 3 side) of the nonlinear resistive film 5 may be lower than that in an inner layer (grounded tank 2 side).

FIG. 11 is a diagram showing a content ratio distribution in which the content ratio of the nonlinear resistive material 52 in the thickness direction of the nonlinear resistive film 5 according to Embodiment 3 is different from that in FIG. 10. The content ratio of the nonlinear resistive material 52 at a portion of the third layer from the grounded tank 2 is lower than that at a portion of the second layer from the grounded tank 2. However, in this case, the effect of preventing interfacial separation becomes smaller because the difference in content ratio of the nonlinear resistive material 52 among the layers is larger than that in the case of FIG. 10.

Furthermore, in connection with the above point, a portion having the higher content ratio of the nonlinear resistive material 52 than the layer (outermost layer) closest to the center conductor 3 may be present in the inner layers. However, in all the layers from the innermost layer to the outermost layer, the content ratio of the nonlinear resistive material 52 is set not to exceed the specified upper limit value.

Embodiment 4

Next, a gas-insulated switchgear according to Embodiment 4 of the present invention will be described with reference to FIGS. 12 to 14.

Figure 12:
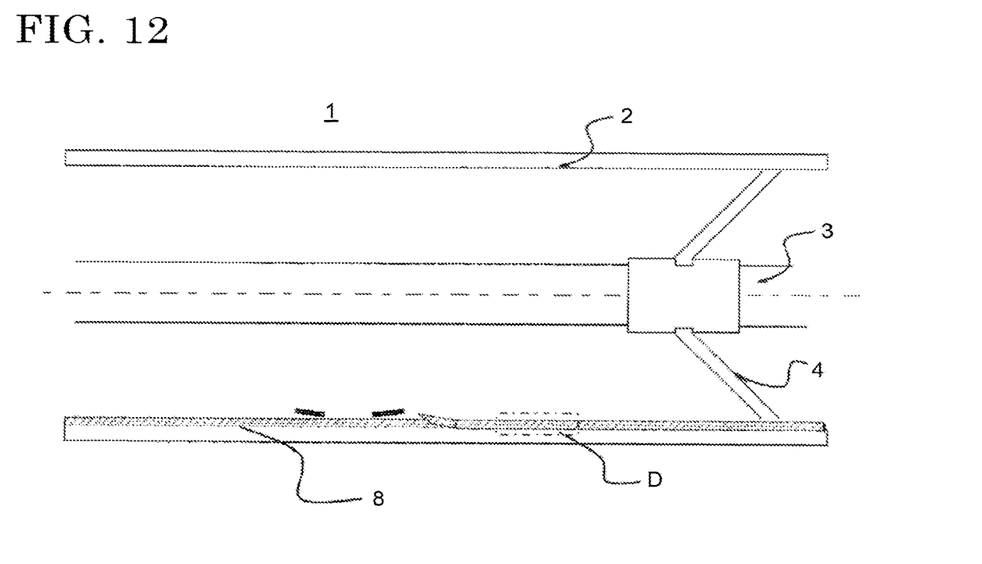
FIG. 12 is an axial cross-sectional view of a gas-insulated switchgear according to Embodiment 4 of the present invention.
Figure 13:
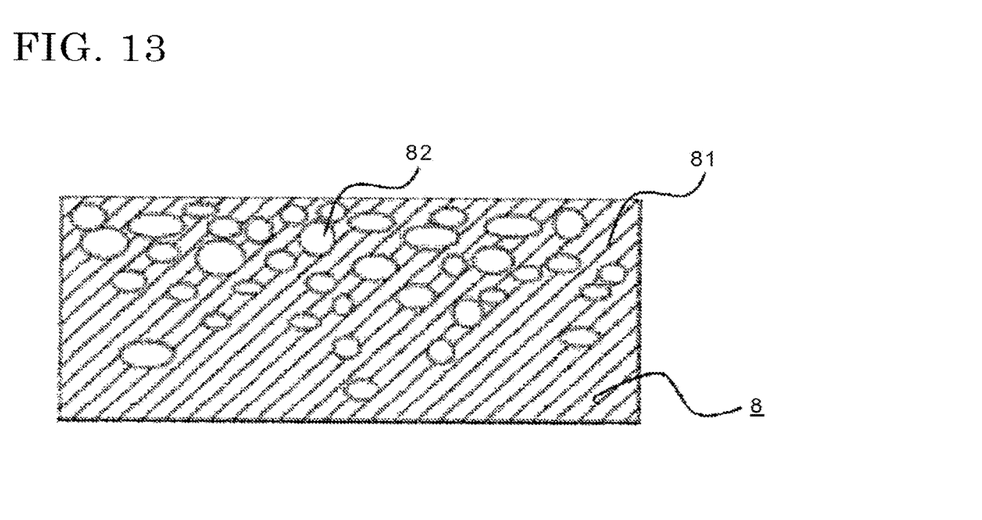
FIG. 13 is an enlarged view of a part D shown in FIG. 12.

FIG. 12 is an axial cross-sectional view of the gas-insulated switchgear according to Embodiment 4. FIG. 13 is an enlarged view of a part D shown in FIG. 12. FIG. 14 is a diagram showing the content ratio distribution of a nonlinear resistive material in the thickness direction of a nonlinear resistive film according to Embodiment 4. In FIG. 12, components identical or corresponding to those shown in FIG. 1 are denoted by same reference characters, and the detailed description thereof is omitted.

In Embodiment 3, coating is performed a plurality of times while the content ratio of the nonlinear resistive material 52 is slightly changed, to obtain the nonlinear resistive film 5 in which the content ratio of the nonlinear resistive material 52 at the center conductor 3 side is higher than that at the grounded tank 2 side. In Embodiment 4, a nonlinear resistive sheet 8 in which the content ratios of an insulating material 81 and a nonlinear resistive material 82 change in the thickness direction is disposed on the inner surface of the grounded tank 2.

The nonlinear resistive sheet 8 is formed of the insulating material 81 and the nonlinear resistive material 82, and the content ratio of the nonlinear resistive material 82 changes in the thickness direction. A surface of the nonlinear resistive sheet 8 in contact with the grounded tank 2 has a higher content ratio of the insulating material 81, and a surface of the nonlinear resistive sheet 8 facing the center conductor 3 has a higher content ratio of the nonlinear resistive material 82.

Figure 14:
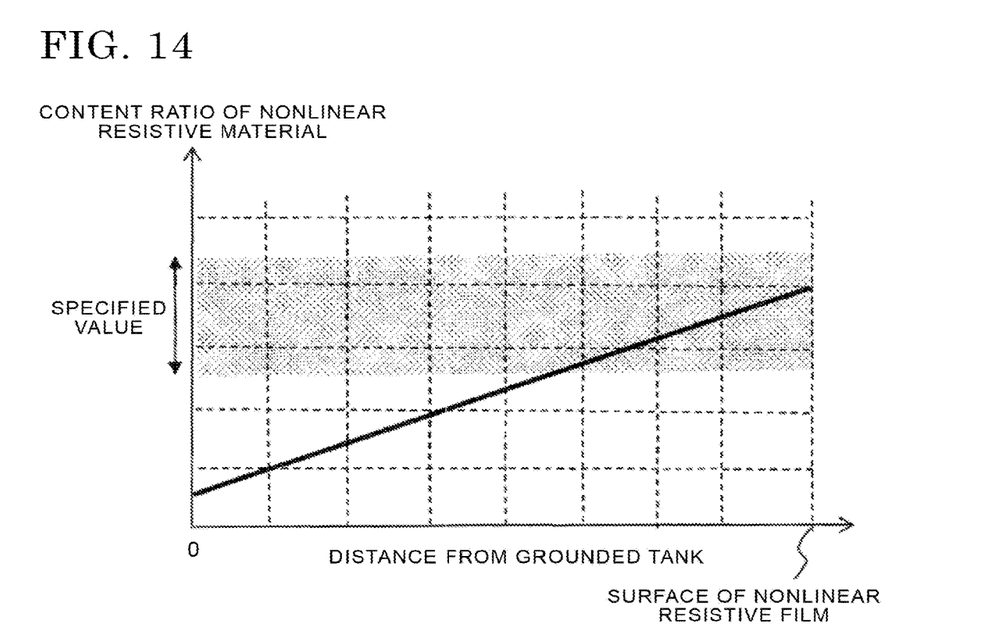
FIG. 14 is a diagram showing the content ratio distribution of a nonlinear resistive material in the thickness direction of a nonlinear resistive film according to Embodiment 4 of the present invention.

The content ratio (filling ratio) distribution of the nonlinear resistive material 82 may increase monotonously in the thickness direction of the nonlinear resistive sheet 8, as shown in FIG. 14. However, a portion may be included in which the content ratio of the nonlinear resistive material 82 at the center conductor 3 side (inner circumferential side) is lower than that at the grounded tank 2 side (outer circumferential side). The content ratio of the nonlinear resistive material 82 at a portion of the nonlinear resistive sheet 8 facing the center conductor 3 is set to fall within the aforementioned specified value range. Further, the resistivity of a portion, in a high electric field region, of the nonlinear resistive sheet 8 facing the center conductor 3 is set to be lower than the resistivity at which the electric field relaxation time constant is equal to the discharge time delay.

As shown in FIG. 12, a plurality of the nonlinear resistive sheets 8 are spread over the grounded tank 2. The nonlinear resistive sheets 8 are disposed so as to overlap the adjacent nonlinear resistive sheets 8 at the ends thereof and a portion, of the inner surface of the grounded tank 2, over which the nonlinear resistive sheet 8 is not spread is not exposed.

Next, a description will be given of a method for producing the nonlinear resistive sheet 8 having the aforementioned distribution of the content ratio of the nonlinear resistive material 82 in the thickness direction.

Examples of a method for achieving the aforementioned distribution of the content ratio of the nonlinear resistive material 82 include a method for continuously changing the ratios of the insulating material 81 and the nonlinear resistive material 82 by using a centrifugal force. When a centrifugal force is applied to the insulating material 81 containing the nonlinear resistive material 82, the content of the nonlinear resistive material 82 is high in a portion distant from the rotation axis and the content of the nonlinear resistive material 82 is low in a portion near the rotation axis, so that the content ratio of the nonlinear resistive material 82 is continuously distributed. The shape of the content ratio distribution of the nonlinear resistive material 82 can be adjusted on the basis of the rotation rate per unit time or the rotation time, for example.

By using the aforementioned nonlinear resistive sheet 8, a high resistance value can be maintained in a region near the grounded tank 2 because the content ratio of the insulating material 81 is high in the region. Thus, even when a high voltage is applied for a long time, inflow of charges from the grounded tank 2 to the metallic foreign substance 6 can be suppressed, and the metallic foreign substance 6 is prevented from becoming charged. Accordingly, behavior of the metallic foreign substance 6 can be suppressed. In addition, because the content ratio of the nonlinear resistive material 82 at the side near the center conductor 3 is within the aforementioned specified value range, an electric field near the metallic foreign substance 6 can be relaxed by the nonlinear resistive material 82, and occurrence of partial discharge can be suppressed.

In the nonlinear resistive film 5 according to Embodiment 3, the content ratio of the nonlinear resistive material 52 changes stepwise from the grounded tank 2 side toward the center conductor 3 side. However, in Embodiment 4, the content ratio of the nonlinear resistive material 82 changes continuously from the grounded tank 2 side toward the center conductor 3 side. Therefore, the effect of preventing interfacial separation in the nonlinear resistive sheet 8 is greater than that of Embodiment 3.

Furthermore, in order to form the nonlinear resistive film 5, coating needs to be performed a plurality of times in Embodiment 3, but the prepared nonlinear resistive sheets 8 only need to be disposed in Embodiment 4. Therefore, a time to form a nonlinear resistive part on the grounded tank 2 can be shortened.

Embodiment 5

Next, a gas-insulated switchgear according to Embodiment 5 of the present invention will be described with reference to FIGS. 15 and 16.

Figure 15:
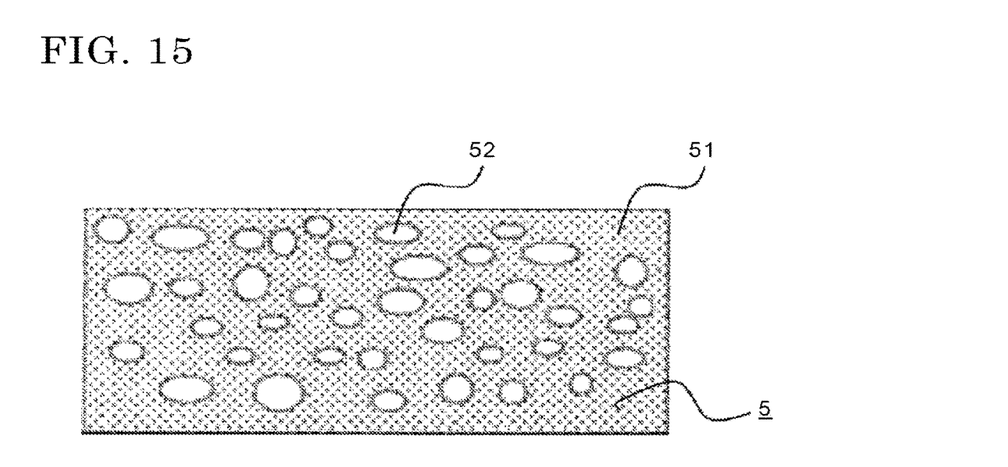
FIG. 15 is a cross-sectional view of a nonlinear resistive film according to Embodiment 5 of the present invention in an uncured state immediately after being coated on a grounded tank.
Figure 16:
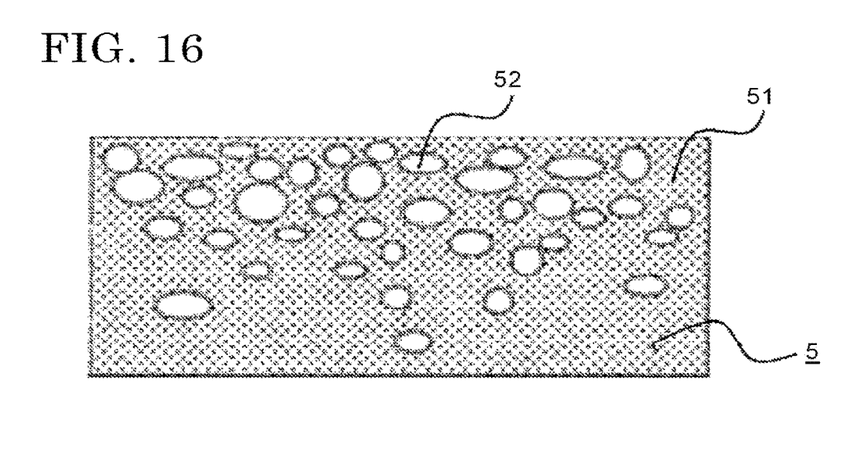
FIG. 16 is a cross-sectional view of the nonlinear resistive film according to Embodiment 5 of the present invention in a cured state after being coated on the grounded tank.

FIG. 15 is a cross-sectional view of a nonlinear resistive film in an uncured state immediately after being coated on the grounded tank. FIG. 16 is a cross-sectional view of the nonlinear resistive film in a cured state.

In Embodiment 3, coating is performed a plurality of times while the content ratio of the nonlinear resistive material 52 is slightly changed, to obtain the nonlinear resistive film 5 in which the content ratio of the insulating material 51 is higher in a region near the grounded tank 2 and the content ratio of the nonlinear resistive material 52 is higher in a region near the center conductor 3.

On the other hand, in Embodiment 5, the nonlinear resistive film 5 of the nonlinear resistive material 52 having a lower specific gravity than the insulating material 51 is used. Accordingly, the nonlinear resistive film 5 can be obtained in which, in an uncured state immediately after being coated on the grounded tank 2, as shown in FIG. 15, the nonlinear resistive material 52 and the insulating material 51 are evenly mixed, but, in a cured state, as shown in FIG. 16, the ratio of the insulating material 51 is higher in the region near the grounded tank 2 and the content ratio of the nonlinear resistive material 52 is higher in the region near the center conductor 3, similarly as in Embodiment 3.

In FIG. 15, the nonlinear resistive material 52 is uniformly distributed in the thickness direction inside the nonlinear resistive film 5. However, this is optional. A combination of the nonlinear resistive material 52 and the insulating material 51 is selected such that the specific gravity of the nonlinear resistive material 52 is lower than that of the insulating material 51.

As the typical nonlinear resistive material 52, silicon carbide, zinc oxide, gallium nitride, and diamond have specific gravities of 3.22 g/cm$^3$, 5.6 g/cm$^3$, 6.1 g/cm$^3$, and 3.52 g/cm$^3$, respectively.

On the other hand, the specific gravity of an epoxy resin, which is generally used as the insulating material 51, is 1 to 1.2 g/cm$^3$. Therefore, when Embodiment 5 is employed, the insulating material 51 having a higher specific gravity than epoxy needs to be adopted. In order to cause the content ratio of the nonlinear resistive material 52 in a portion of the nonlinear resistive film 5 facing the center conductor 3 to fall within the aforementioned specified value range, the curing condition needs to be adjusted.

By selecting the nonlinear resistive material 52 and the insulating material 51 as described above, the nonlinear resistive film 5 can be obtained in which the ratio of the insulating material 51 is higher in the region near the grounded tank 2 and the ratio of the nonlinear resistive material 52 is higher in the region near the center conductor 3, as in the third and Embodiment 4s, because the nonlinear resistive material 52 moves upward (to the side near the center conductor 3) and the insulating material 51 moves downward (to the side near the grounded tank 2) before curing is completed after coating.

With the nonlinear resistive film 5 configured as described above, a high resistance value can be maintained in the region near the grounded tank 2 because the ratio of the insulating material 51 having a high resistance value is higher in the region. Thus, even when a high voltage is applied for a long time, inflow of charges from the grounded tank 2 to the metallic foreign substance 6 can be suppressed, and the metallic foreign substance 6 is prevented from becoming charged. Accordingly, behavior of the metallic foreign substance 6 can be suppressed. Further, because the content ratio of the nonlinear resistive material 52 at the side near the center conductor 3 is within the aforementioned specified value range, an electric field near the metallic foreign substance 6 can be relaxed, and occurrence of partial discharge can be suppressed.

By the method of Embodiment 5, the nonlinear resistive film 5 can be formed at one time. Accordingly, processing time and cost required to form the nonlinear resistive film 5 can be reduced, as compared with the method of Embodiment 3.

In the nonlinear resistive film 5 according to Embodiment 3, the content ratio of the nonlinear resistive material 52 changes stepwise from the grounded tank 2 side to the center conductor 3 side. However, in Embodiment 5, the content ratio of the nonlinear resistive material 52 changes continuously from the grounded tank 2 side toward the center conductor 3 side. Therefore, the effect of preventing interfacial separation is greater than that of Embodiment 3.

Embodiment 6

Next, a gas-insulated switchgear according to Embodiment 6 of the present invention will be described with reference to FIGS. 17 to 19.

Figure 17:
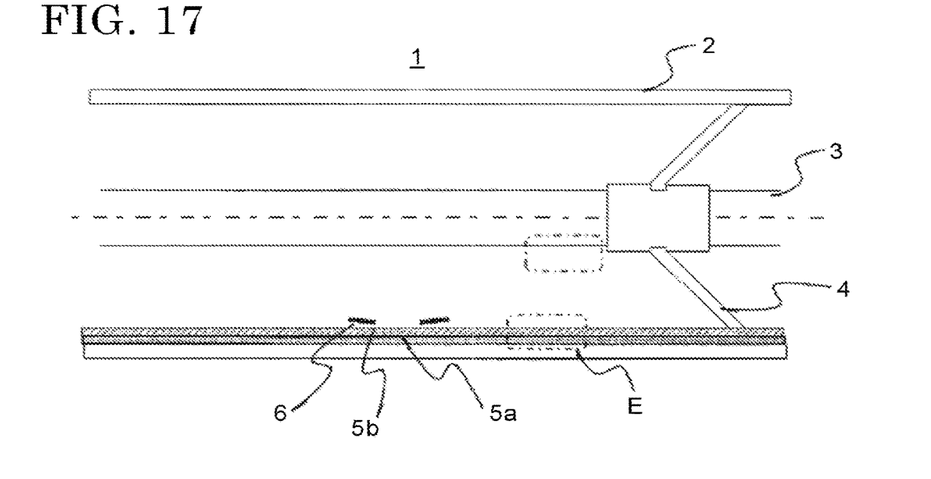
FIG. 17 is an axial cross-sectional view of a gas-insulated switchgear according to Embodiment 6 of the present invention.

FIG. 17 is an axial cross-sectional view of the gas-insulated switchgear according to Embodiment 6. FIG. 18 is an enlarged diagram of a part E shown in FIG. 17. FIG. 19 is a diagram illustrating nonlinear resistive characteristics of a first nonlinear resistive film and a second nonlinear resistive film according to Embodiment 6. In FIGS. 17 and 18, components identical or corresponding to those shown in FIGS. 1 and 2 are denoted by the same reference characters, and the detailed description thereof is omitted.

In Embodiments 1 to 5, one type of the nonlinear resistive material 52 or 82 is used. In Embodiment 6, two layers of the nonlinear resistive films 5 using two types of nonlinear resistive materials having different electrical field intensities at which the resistivity thereof changes is formed.

Figure 18:
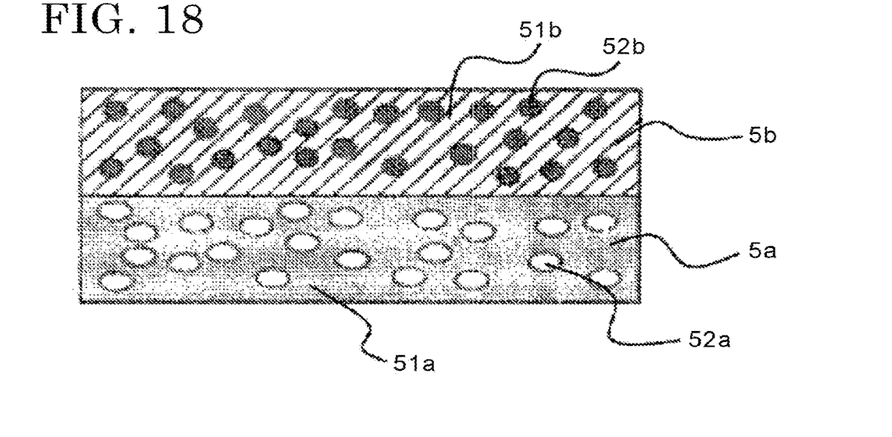
FIG. 18 is an enlarged view of a part E shown in FIG. 17.

As shown in FIG. 18, a first nonlinear resistive film 5a (first nonlinear resistive part) formed of a first insulating material 51a containing a first nonlinear resistive material 52a is disposed on the inner surface of the grounded tank 2. Further, a second nonlinear resistive film 5b (second nonlinear resistive part) formed of a second insulating material 51b containing a second nonlinear resistive material 52b is disposed on the surface of the first nonlinear resistive film 5a. The first nonlinear resistive film 5a and the second nonlinear resistive film 5b may be identical to or may be different from each other. However, when the first nonlinear resistive film 5a and the second nonlinear resistive film 5b are identical to each other, the adhesion therebetween becomes greater.

Figure 19:
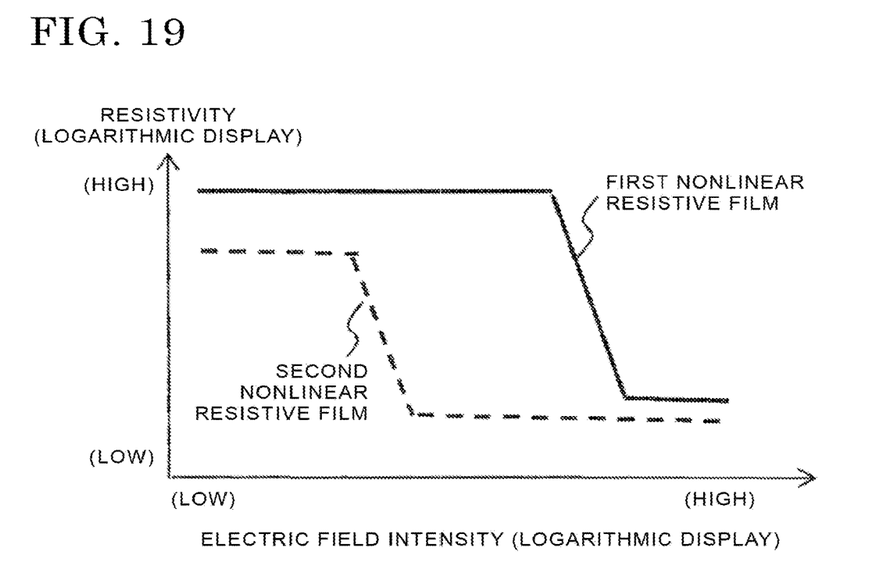
FIG. 19 is a diagram illustrating nonlinear resistive characteristics of a first nonlinear resistive film and a second nonlinear resistive film.

The nonlinear resistive characteristics of the first nonlinear resistive film 5a and the second nonlinear resistive film 5b are as shown in FIG. 19. The electric field intensity at which the resistivity of the first nonlinear resistive film 5a changes is set to be higher than that of the nonlinear resistive film 5b. That is, the electric field intensity at which the resistivity of the first nonlinear resistive material 52a changes is set to be higher than that of the second nonlinear resistive material 52b, and the resistivity of the first nonlinear resistive film 5a is set so as to decrease in a higher electric field region, as compared with the second nonlinear resistive film 5b. Here, the electric field intensity at which a resistivity changes (decreases) is the electric field intensity at which the nonlinear resistive film changes from an insulating film to a conductive film. For example, the content ratio of the first nonlinear resistive material 52a in the first insulating material 51a is equal to the content ratio of the second nonlinear resistive material 52b in the second insulating material 51b.

In a low electric field region in which the resistivity is unchanged (not decreased), the resistivity of the first nonlinear resistive film 5a is preferably equal to or higher than that of the second nonlinear resistive film 5b. That is, the resistivity of the first nonlinear resistive film 5a in an electric field region having an intensity lower than the electric field intensity at which the resistivity of the first nonlinear resistive film 5a changes (decreases) is preferably equal to or higher than the resistivity of the second nonlinear resistive film 5b in an electric field region having an intensity lower than the intensity electric field at which the resistivity of the second nonlinear resistive film 5b changes (decreases).

With the first nonlinear resistive film 5a and the second nonlinear resistive film 5b configured as described above, only the second nonlinear resistive film 5b has a low resistivity in a stage where the intensity of an electric field around the metallic foreign substance 6 is low, charges are released in the direction toward the surface of the nonlinear resistive films, and thus the metallic foreign substance 6 can be suppressed from becoming charged. At this time, inflow of charges from the grounded tank 2 to the metallic foreign substance 6 can be suppressed because the first nonlinear resistive film 5a maintains a high resistivity.

With the first nonlinear resistive film 5a and the second nonlinear resistive film 5b configured as described above, partial discharge can be suppressed around the metallic foreign substance 6, inflow of charges from the grounded tank 2 to the metallic foreign substance 6 also can be suppressed, and thus the metallic foreign substance can be prevented from becoming charged.

Because an electric field region showing the nonlinear resistive characteristic of the first nonlinear resistive film 5a is shifted from that of the second nonlinear resistive film 5b, a wider region has nonlinear resistive characteristics, so that variation in film thickness or the like is more easily accepted than in the conventional technique.

Although embodiments of the present invention have been described above, the present invention is not limited to the embodiments, and various design modifications can be made. Within the scope of the present invention, the above embodiments may be freely combined with each other, or each of the above embodiments may be modified or simplified as appropriate.

DESCRIPTION OF THE REFERENCE CHARACTERS 1 gas-insulated switchgear
2 grounding tank
3 center conductor
4 insulating support member
5, 5a, 5b nonlinear resistive film
6 metallic foreign substance
7 insulating film
8 nonlinear resistive film
51, 51a, 51b, 81 insulating material
52, 52a, 52b, 82 nonlinear resistive material

The invention claimed is:

1. A gas-insulated switchgear comprising:
a grounded tank filled with gas;
a center conductor which is disposed in the grounded tank and to which a voltage is applied;
an electrically insulating support member which is attached to the grounded tank and which electrically insulates and supports the center conductor; and
a nonlinear resistive part which is disposed at least on a vertically lower side inner surface of the grounded tank and which is formed by an electrically insulating material containing a nonlinear resistive material, wherein
if an electric field applied to the nonlinear resistive part is higher than an electric field value in a vicinity of a contact point between the nonlinear resistive part and a metallic foreign substance mixed in the grounded tank when an operation voltage is applied but no electric field relaxation has occurred, a resistivity of the nonlinear resistive part is lower than a resistivity at which a discharge delay time is equal to an electric field relaxation time constant.

2. The gas-insulated switchgear according to claim 1, wherein the switchgear includes an electrically insulating film between the grounded tank and the nonlinear resistive part.

3. The gas-insulated switchgear according to claim 1, wherein the resistivity of the nonlinear resistive part at the center conductor side is a value at which a product of a vacuum permittivity, a relative permittivity of the nonlinear resistive part, and a resistivity of the nonlinear resistive part is less than 50 ns.

4. The gas-insulated switchgear according to claim 1, wherein the nonlinear resistive part contains the nonlinear resistive material in a larger amount at the center conductor side than that at the grounded tank side.

5. The gas-insulated switchgear according to claim 4, wherein a content ratio of the nonlinear resistive material at the center conductor side falls within a range determined on the basis of a condition for causing the nonlinear resistive part to exhibit a nonlinear resistive characteristic and securing desired strength of the nonlinear resistive part.

6. The gas-insulated switchgear according to claim 1, wherein the nonlinear resistive part is a coating film formed by an electrically insulating coating material as the electrically insulating material containing the nonlinear resistive material.

7. The gas-insulated switchgear according to claim 6, wherein the coating film includes a plurality of layers formed by performing coating a plurality of times while the content ratio of the nonlinear resistive material is changed.

8. The gas-insulated switchgear according to claim 7, wherein the content ratio of the nonlinear resistive material increases stepwise from the grounded tank side toward the center conductor side.

9. The gas-insulated switchgear according to claim 6, wherein the nonlinear resistive material has a lower specific gravity than the electrically insulating material.

10. The gas-insulated switchgear according to claim 9, wherein the content ratio of the nonlinear resistive material increases continuously from the grounded tank side toward the center conductor side.

11. The gas-insulated switchgear according to claim 1, wherein the nonlinear resistive part is a nonlinear resistive sheet formed by an electrically insulating coating material as the electrically insulating material containing the nonlinear resistive material.

12. The gas-insulated switchgear according to claim 11, wherein the content ratio of the nonlinear resistive material increases continuously from the grounded tank side toward the center conductor side.

13. The gas-insulated switchgear according to claim 6, wherein the nonlinear resistive material has a higher thermal conductivity than the electrically insulating material.

14. A gas-insulated switchgear comprising:
a grounded tank filled with gas;
a center conductor which is disposed in the grounded tank and to which a voltage is applied;
an electrically insulating support member which is attached to the grounded tank and which electrically insulates and supports the center conductor;
a first nonlinear resistive part which is disposed at least on a vertically lower side inner surface of the grounded tank and which is formed by a first electrically insulating material containing a first nonlinear resistive material; and
a second nonlinear resistive part which is disposed on a surface of the first nonlinear resistive part and which is formed by a second electrically insulating material containing a second nonlinear resistive material, wherein
an electric field intensity at which a resistivity of the first nonlinear resistive part changes is higher than that of the second nonlinear resistive part.

15. The gas-insulated switchgear according to claim 14, wherein the resistivity of the first nonlinear resistive part in an electric field region having an intensity lower than the electric field intensity at which the resistivity of the first nonlinear resistive part changes is higher than the resistivity of the second nonlinear resistive part in an electric field region having an intensity lower than the electric field intensity at which the resistivity of the second nonlinear resistive part changes.

16. The gas-insulated switchgear according to claim 1, wherein the nonlinear resistive material is silicon carbide or zinc oxide.

17. The gas-insulated switchgear according to claim 1, wherein the nonlinear resistive material is a mixture of a plurality of types selected from among silicon carbide, zinc oxide, gallium nitride, and diamond.

\* \* \* \* \*